United States Patent
Chen et al.

(10) Patent No.: US 7,140,860 B2
(45) Date of Patent: Nov. 28, 2006

(54) TWO STAGE INJECTION MOLDING MACHINE HAVING PRESSURE SENSOR DEVICE

(75) Inventors: Ming-Chi Chen, Hsinchu (TW); Wen-Hung Feng, Hsinchu (TW); Ming-Chang Teng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 382 days.

(21) Appl. No.: 10/795,248

(22) Filed: Mar. 9, 2004

(65) Prior Publication Data

US 2005/0142245 A1 Jun. 30, 2005

(30) Foreign Application Priority Data

Dec. 24, 2003 (TW) .............................. 92136670 A

(51) Int. Cl.
*B29C 45/77* (2006.01)
(52) U.S. Cl. .................. 425/145; 425/557; 425/561
(58) Field of Classification Search ................ 425/145, 425/557, 558, 559, 560, 561
See application file for complete search history.

(56) References Cited

U.S. PATENT DOCUMENTS

| | | | |
|---|---|---|---|
| 2,881,477 A * | 4/1959 | Triulzi | 425/145 |
| 5,356,575 A * | 10/1994 | Krosse et al. | 425/145 |
| 5,421,712 A | 6/1995 | Laing et al. | |
| 7,021,917 B1 * | 4/2006 | Uchiyama et al. | 425/149 |

* cited by examiner

*Primary Examiner*—Tim Heitbrink
(74) *Attorney, Agent, or Firm*—Rabin & Berdo P.C.

(57) ABSTRACT

A two-stage injection molding machine having a pressure sensor device is proposed. The two-stage injection molding machine includes an injection part having an injection cylinder, a driving unit, and an injection rod installed in the injection cylinder; a metering part for feeding plastic material to the injection cylinder of the injection part; and a loadcell installed between the injection rod and the driving unit, wherein pressures in the injection cylinder during the feed metering, injection, and packing processes are detected via the loadcell and the pressure sensor rod. As a result, an accurate pressure feedback control is implemented to achieve high precision injection molding quality. And with the two-stage injection molding machine having such a simple structural design, occurrence of signal distortion and delayed response is prevented.

8 Claims, 5 Drawing Sheets

TWO STAGE INJECTION MOLDING MACHINE HAVING PRESSURE SENSOR DEVICE

BACKGROUND OF THE INVENTION

1. Field of the Invention

The invention relates to a two stage injection molding machine having a pressure sensor device capable of detecting pressures during injection, packing and metering processes so as to implement a feedback control for a two stage injection molding machine.

2. Description of the Related Art

As demand for precision and quality of the injection molding is constantly increased, it becomes more important to control the injection speed, precision, and injection pressure for a two-stage injection molding machine used to fabricate small-scale products. However, the typical injection molding machine adopts a servomotor that merely implements a feedback control in terms of speed and position, without function for detecting pressure values during the injection, packing, and metering processes or function for implementing pressure feedback control, posing a huge limitation for the high precision injection.

Currently, the most common improvement from the conventional injection molding machine involves a loadcell for instantly detecting the force subjected to the screw rod of the injection molding machine. By comparative calculation, the difference between the actual force and preset force is compensated to achieve injection control, packing control, and back pressure metering control. FIG. 5 illustrates a injection rod construction for screw rotating and advancing device for injection molding machine as disclosed in an U.S. Pat. No. 5,421,712 to Laing et al., where the loadcell 40 installed in an injection movable platen 42 sense the axial force change and input the change to a control system, so that the control system correct the output force of the injection servomotor according to the axial force error, so as to correctly control molten pressure for achieving injection pressure control for the closed circuit.

However, for such conventional improvement involving an overly complicated mechanism design, the force is not correctly and thoroughly transmitted through the loadcell 40. Therefore, the injection pressure, packing pressure and metering back pressure sensed by the loadcell 40 are not the actual pressures experienced by the plastic injection screw rod 41. Meanwhile, when the injection and metering processes are performed, the friction force generated between the injection movable platen 42 and the injection guide rod 43 also vary depending on speed of the movement for injection movable platen 42, degree of lubrication, and environmental factors, while these uncertainties also have influence on the injection force. So, the friction force has to be compensated in order to achieve the high precision injection. Yet, according to the injection rod in the above mentioned patent disclosure, the injection force and friction force sensed by the loadcell 40 are all distorted, leading to a lack of feedback signal required for compensating the injection force. Consequently, it is difficult to achieve control of the injection pressure, packing pressure, and metering back pressure required for high speed precision injection molding.

Thus, the problem to be solved herein is to provide a pressure sensor device adapted to the two-stage injection molding machine, for thoroughly sensing the force and pressure data required during the injection, packing, and metering processes with a simple mechanism of the pressure sensor device such that a closed circuit feedback control is implemented, and the conventional problems such as signal distortion and delayed response are resolved as a result.

SUMMARY OF THE INVENTION

The primary objective of the present invention is to provide a two-stage injection molding machine having a pressure sensor device capable of achieving high precision molding requirement for a two-stage injection molding machine.

Another objective of the present invention is to provide a two-stage injection molding machine having a pressure sensor device capable of thoroughly detecting pressures during the injection, packing and metering processes for the two-stage injection molding machine.

A further objective of the present invention is to provide a two-stage injection molding machine having a pressure sensor device that has a simplified structure for the two-stage injection molding machine.

In accordance with the above and other objectives, the present invention proposes a two-stage injection molding machine having a pressure sensor device. The two-stage injection molding machine having a pressure sensor device includes an injection part having an injection cylinder, a driving unit, and an injection rod installed in the injection cylinder; a feeder metering part that allows plastic material to be fed in the injection cylinder of the injection part in such a way that the injection rod is driven by the driving unit to inject out the plastic material; and a loadcell installed between the injection rod and the driving unit for detecting pressures in the injection cylinder during the feed metering, injection, and packing processes.

The two-stage injection molding machine having a pressure sensor device also includes an injection part having an injection cylinder, a driving unit, and an injection rod installed in the injection cylinder; a feeder metering part that allows plastic material to be fed in the injection cylinder of the injection part in such a way that the injection rod is driven by the driving unit to inject out the plastic material; a loadcell installed between the injection rod and the driving unit; and a pressure sensor rod located in the injection rod and connected to the loadcell, so that pressures in the injection cylinder during the feed metering, injection, and packing processes are detected via the pressure sensor rod and the loadcell.

The two-stage injection molding machine having a pressure sensor device further includes an injection part having an injection cylinder, a driving unit, and an injection rod installed in the injection cylinder; a feeder metering part that allows plastic material to be fed in the injection cylinder of the injection part in such a way that the injection rod is driven by the driving unit to inject out the plastic material; a loadcell installed between the injection rod and the driving unit; and a pressure sensor rod installed in the injection cylinder to connect respectively to a front end of the injection cylinder and the loadcell, so that pressures at the front end of the injection cylinder during the feed metering, injection, and packing processes are detected via the pressure sensor rod and the loadcell.

The two-stage injection molding machine having a pressure sensor device yet further includes an injection part having an injection cylinder, a driving unit, and an injection rod installed in the injection cylinder; a feeder metering part that allows plastic material to be fed in the injection cylinder of the injection part in such a way that the injection rod is driven by the driving unit to inject out the plastic material;

and at least a pressure sensor unit formed on the injection cylinder to contact with the plastic material in the injection cylinder, so that pressures in the injection cylinder during the feed metering, injection, and packing processes are detected by the pressure sensor unit.

The above-mentioned two-stage injection molding machine having a pressure sensor device further comprises a feedback control unit for feeding the pressure data detected by the loadcell back to the driving unit to implement pressure compensation correction. Also, the driving unit preferably includes an assembly of ball guided screwing rod and servomotor and an assembly of gas/oil pressure cylinder and linear motor. The feeder metering part comprises a feeder cylinder, a feeder hopper, a back valve element, a feeder screw rod, and a feeder driving motor. And with the feeder screw rod driven by the driving motor to implement feeder metering, the desired plastic material is fed in the injection cylinder of the injection part.

The pressure sensor device has a simple structural design to be applied to the two-stage injection molding machine without occurrence of conventional drawbacks such as distorted detection for the injection force and the friction force, and free of problems such as signal distortion and delayed response during the detecting process, so as to achieve the high precision injection molding quality, while thoroughly resolving conventional problems.

To provide a further understanding of the invention, the following detailed description illustrates embodiments and examples of the invention, it is to be understood that this detailed description is being provided only for illustration of the invention and not as limiting the scope of this invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
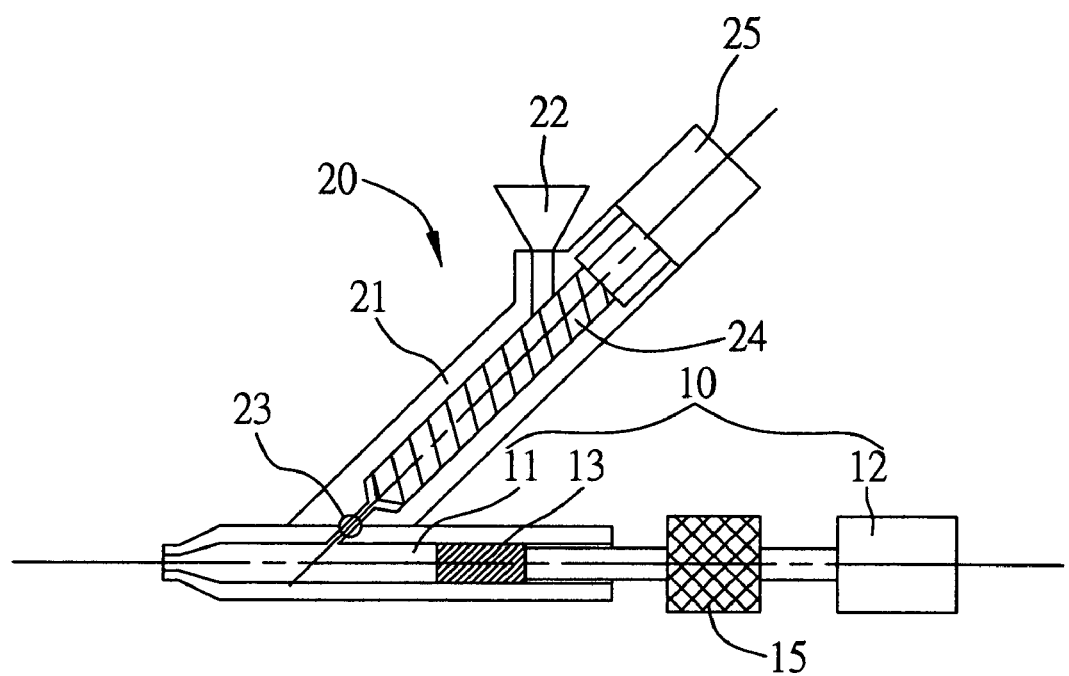
FIG. 1 is a side view of a two-stage injection molding machine according to a first embodiment of the present invention.

FIG. 1 illustrates a two-stage injection molding machine having a pressure sensor device according to the first embodiment. The injection molding machine comprises an injection part 10 having an injection cylinder 11, a driving unit 12, and an injection plunger 13, and a feeder metering part 20 formed slantwise with an angle on the injection part 10. The feeder metering part 20 allows a plastic material to be fed into the injection cylinder 11 of the injection part 10 before the material is injected out via the injection plunger 13 pushed by the driving unit 12, such as a driver. The invention is also characterized by having a loadcell 15 placed between the driving unit 12 and the injection plunger 13, so that the loadcell 15 is located along an output axis between the driving unit 12 and the injection plunger 13 to connect to both the driving unit 12 and the injection plunger 13. As a result, pressures generated in the injection cylinder 11 during the processes of feeder metering, injection, and packing may be detected to implement an instant feedback control over the injection force and plastic molten pressure via a feedback control unit (not shown), so that driving power of the driver 12 is corrected.

In the present embodiment, the driver 12 may be either an assembly of a ball guidance screw rod and a servomotor or an assembly of a gas/oil pressure cylinder and a linear motor. However, other driving devices capable of driving the injection process may also be applicable to the present invention. As illustrated in the diagram, the feeder metering part 20 comprises of a feeder cylinder 21, a feeder hopper 22, a back valve 23, a feeder screw rod 24, and a feeder driving motor 25. The feeder metering process is carried out via the feeder screw rod 24 driven by the feeder servomotor 25. And other feeder metering parts 20, such as rod-less heated metering parts or sonic wave heated metering parts achieving the same molten metering are also applicable to the present invention.

Therefore, by the design of the present embodiment, the two stage process such as feeding and injecting can be performed while their corresponding pressures may be instantly detected. For instance, plastic beads (not shown) are poured into the feeder cylinder 21 via the feeder hopper 22. Then, the servomotor 25 drives the feeder screw rod 24 to mix, melt, and meter the plastic beads. As the molten plastic enters the injection cylinder 11 through the back valve 23, the molten plastic pressure in the injection cylinder 11 is detected via the load cell 15 installed along the injection axis. And once the molten pressure is converted via the control unit, the driver 12 drives the injection plunger 13 and the loadcell 15 to move backwards while the loadcell keeps detecting the pressure in the injection cylinder 11, so as to establish a multi-stage back pressure metering control mode.

After the metering is completed, the back valve 23 is shut to begin injection operation. During this time, the driver 12 drives the loadcell 15 and the injection rod 13 to move forwards while the loadcell 15 keeps detecting the molten plastic pressure change in the injection cylinder and instantly feeding back the changes to the control unit, so as to establish a speed/pressure switch control mode for the injection and packing processes while achieving a highly precise injection molding with accurate and instant feedback. Accordingly, the device has a simple design and assembly to avoid problems, such as signal distortion and delayed response occurred as a result of mechanism complexity.

Figure 2:
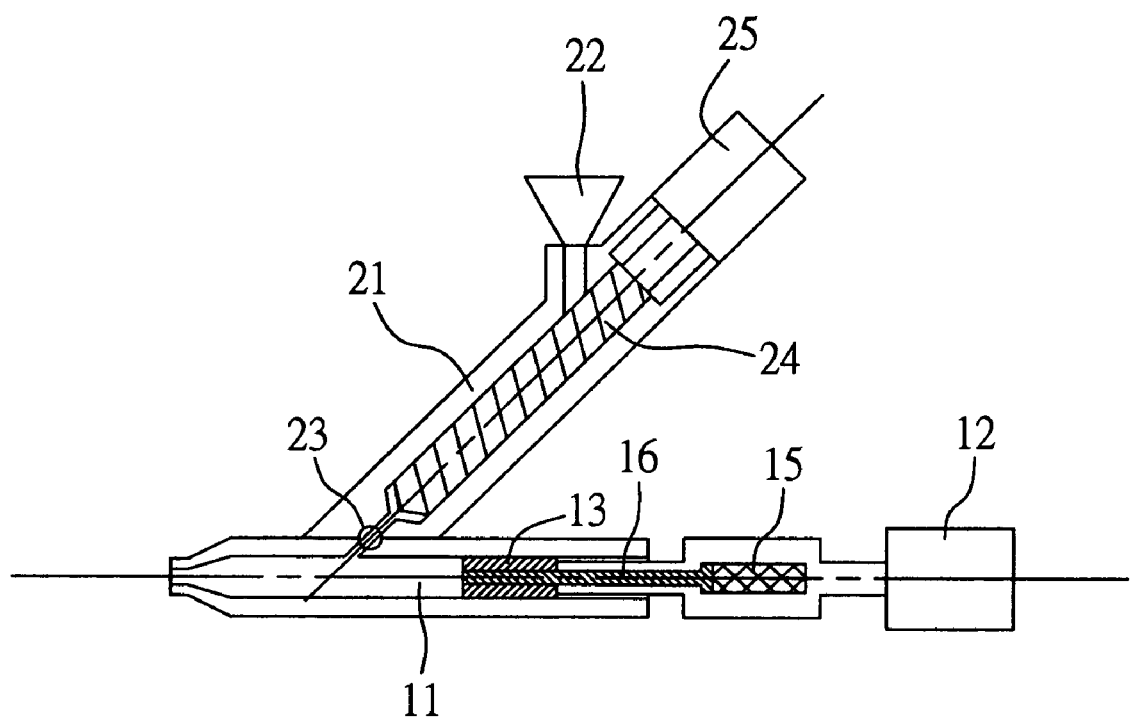
FIG. 2 is a side view of a two-stage injection molding machine according to a second embodiment of the present invention.

FIG. 2 illustrates the second embodiment of the present invention. The loadcell 15 is installed behind the axis of the injection rod 13, while a pressure sensor rod 16 is installed between the loadcell 15 and the injection rod 13, so that the pressure sensor rod 16 extends into the injection rod 13 to detect the injection force and molten plastic pressure in order to implement an instant feedback control.

Similarly, the plastic beads are poured into the feeder cylinder 21 via the feeder hopper 22 in the present embodiment. The plastic beads are mixed, melted, and metered via the feeder screw rod 24 driven by the servomotor 25. As the molten plastic is fed in the feeder cylinder 11 via the opened back valve 23, the molten plastic makes contact with the loadcell 15 via the pressure sensor rod 16 installed on the injection axis, so that the loadcell 15 senses the molten plastic pressure via the pressure sensing rod 16 that is pushed by the molten plastic pressure. And as the pressure is converted via the control unit, the driver 12 is driven to move injection rod 13 and the loadcell 15 backwards, while the loadcell 15 keeps detecting the pressure in the injection cylinder 11 in order to establish a multi-stage back pressure metering control mode. Next, as the metering is complete, the back valve 23 is shut to begin injection. The driver 12 drives the loadcell 15, the pressure sensor rod 16, and the injection rod 13 to move forwards, while the loadcell 15 keeps detecting the molten plastic pressure change in the injection cylinder 11 during the injection process as the pressure sensor rod is subjected to the molten plastic pressure. The pressure change is then instantly fed back to the control unit to establish a speed/pressure switch mode for injection and packing process while achieving the same result as in the first embodiment.

Figure 3:
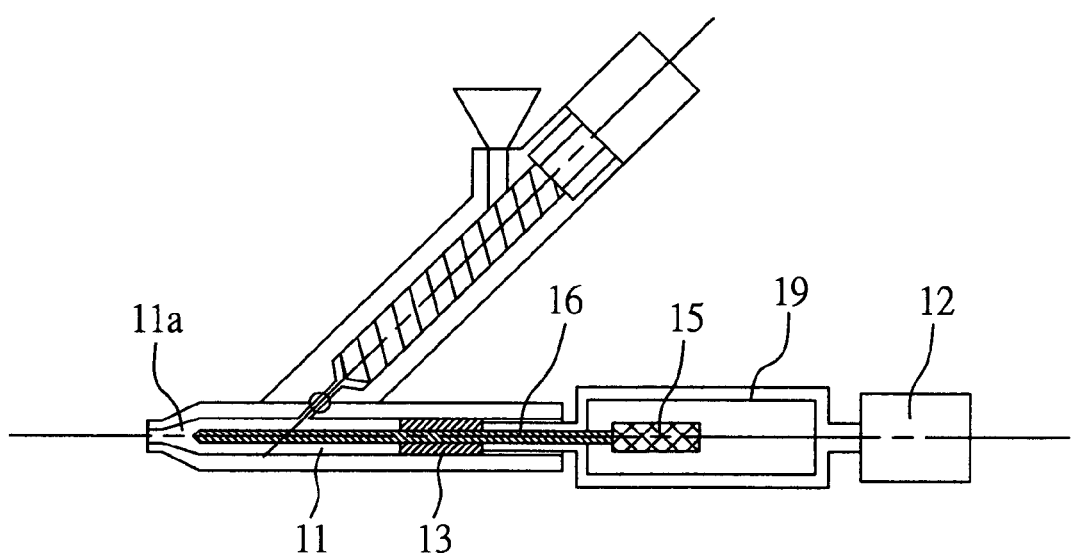
FIG. 3 is a side view of a two-stage injection molding machine according to a third embodiment of the present invention.

Moreover, the pressure sensor rod 16 may also be extended to detect pressure at any section of the injection cylinder 11 according to the third embodiment illustrated in FIG. 3. For instance, the pressure sensor rod 16 may be extended to the front-end 11a of the injection cylinder 11, and the loadcell 15 may be located in a fixation cage 19 that is fixed and connected to the driver 12 to perform the similar injection operation. As the molten plastic pressure change at the front end 11a is constantly detected via the pressure sensor rod 16 and the loadcell 15, the multi-stage back pressure metering control mode and the speed/pressure switch mode for the injection/packing process are established, so that the feedback control is implemented to complete high precision injection molding and achieve satisfactory molding quality.

Figure 4:
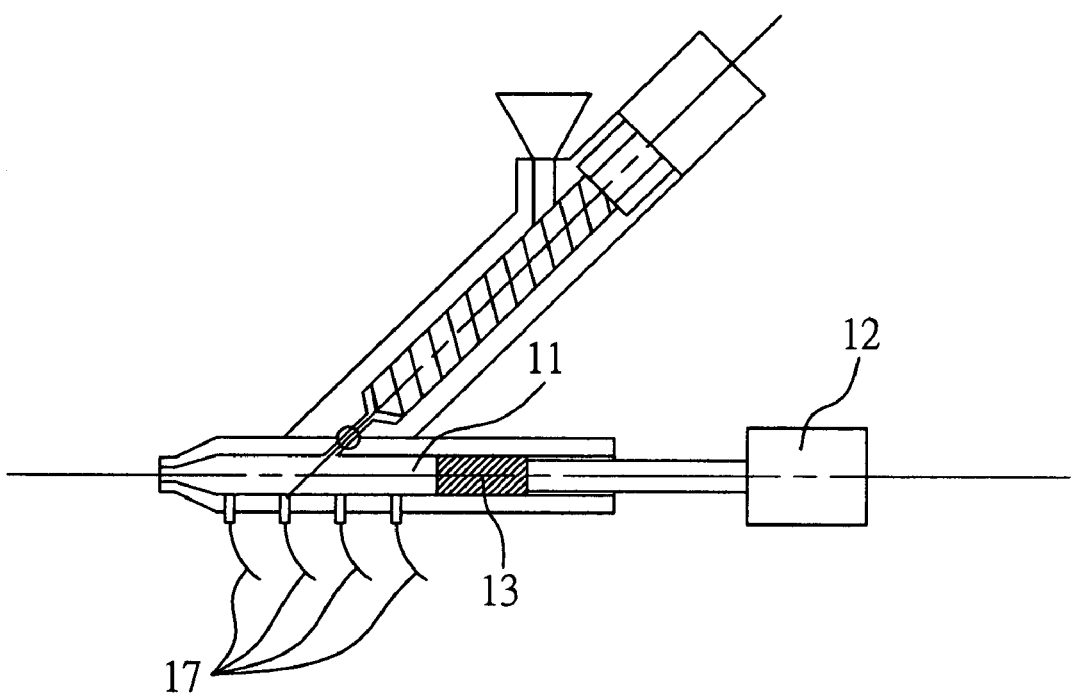
FIG. 4 is a side view of a two-stage injection molding machine according to a fourth embodiment of the present invention.
Figure 5:
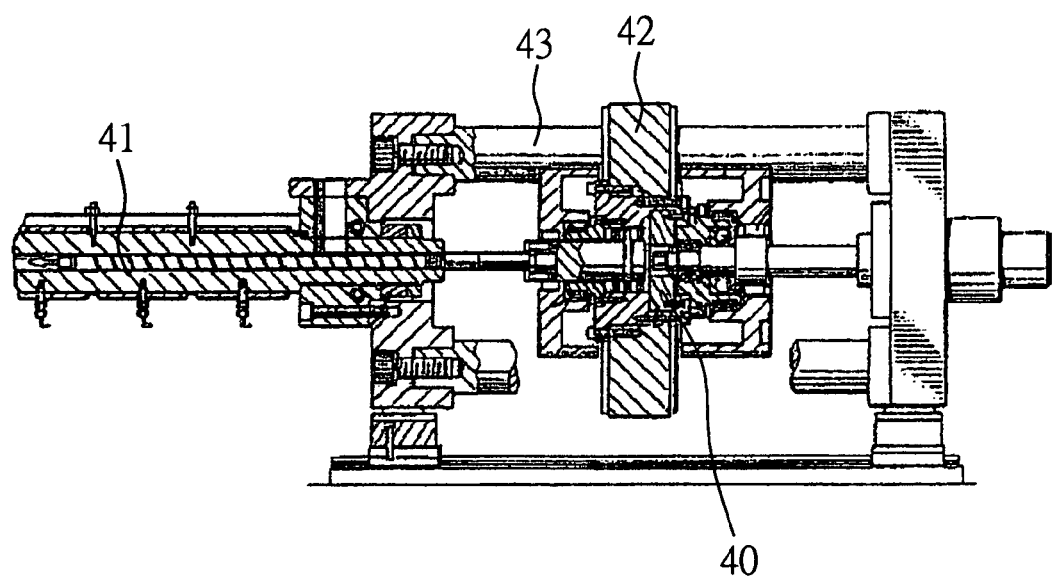
FIG. 5 is a schematic view illustrating an injection rod of a screw rotating and advancing device for injection molding machine as disclosed in an U.S. Pat. No. 5,421,712 to Laing et al.

Apart from different arrangements for loadcell 15 embodied above, a plurality of pressure sensors 17 may also be disposed at specific positions on a side of the injection cylinder 11 according to the fourth embodiment illustrated in FIG. 4. As shown in FIG. 4, four-pressure sensors 17 are formed equally spaced apart on a bottom side of the injection cylinder 11 to detect molten plastic pressure changes at four pre-determined sensor locations. Accordingly, the multi-stage back pressure metering control mode and speed/pressure switch control mode for the injection/packing processes are established, and distribution and change of the pressure at each point are further understood to implement precise pressure compensation correction. Also, the number of the pressure sensors may be increased depending on the needs.

Summarizing from the above, the two-stage injection molding machine having a pressure sensor device has a simple structural design to thoroughly detect pressures in the injection, packing, and metering processes, so as to achieve high precision injection molding quality, without producing problems such as signal distortion and delayed response.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A two-stage injection molding machine having a pressure sensor device, comprising:
   an injection part having an injection cylinder, a driving unit, and an injection rod installed within the injection cylinder;
   a feeder metering part for feeding plastic material to the injection cylinder, so that the injection rod is driven by the driving unit to implement plastic injection;
   a loadcell installed between the injection rod and the driving unit; and
   a pressure sensor rod installed in the injection rod, the pressure sensor rod having a first end making contact to molten plastic and a second end connecting to the loadcell, so that the pressure sensor rod is driven by a molten plastic pressure.

2. The two-stage injection molding machine having a pressure sensor device of claim 1, further comprising a feedback control unit for feeding back pressure data detected by the loadcell to the driving unit, so that a pressure compensation correction is implemented by the driving unit.

3. The two-stage injection molding machine having a pressure sensor device of claim 1, wherein the driving unit includes an assembly of a ball guidance screw rod and a servomotor, or an assembly of a gas/oil pressure cylinder and a linear motor.

4. The two-stage injection molding machine having a pressure sensor device of claim 1, wherein the feed metering part includes a feeder cylinder, a feeder hopper, a back valve, a feeder screw rod, and a feeder servomotor, and the feeder servomotor drives the feeder screw rod to implement feeder metering.

5. A two-stage injection molding machine having a pressure sensor device, comprising:
   an injection part having an injection cylinder, a driving unit, and an injection rod installed within the injection cylinder;
   a feeder metering part for feeding plastic material to the injection cylinder, so that the driving unit drives the injection rod to implement plastic injection;
   a loadcell installed between the injection rod and the driving unit; and
   a pressure sensor rod installed in the injection rod, the pressure sensor rod having a first end making contact to molten plastic and a second end connecting to the loadcell, so that the pressure sensor rod is pushed by a molten plastic pressure to drive the loadcell for sensing the molten plastic pressure, and the loadcell located at front end of the injection cylinder for acquiring the injection pressure during the feeder metering, injection, and packing processes.

6. The two-stage injection molding machine having a pressure sensor device of claim 5, further comprising a feedback control unit for feeding back pressure data detected by the loadcell to the driving unit, so that a pressure compensation correction is implemented by the driving unit.

7. The two-stage injection molding machine having a pressure sensor device of claim 5, wherein the driving unit includes an assembly of a ball guidance screw rod and a servomotor, or an assembly of a gas/oil pressure cylinder and a linear motor.

8. The two-stage injection molding machine having a pressure sensor device of claim 5, wherein the feed metering part includes a feeder cylinder, a feeder hopper, a back valve, a feeder screw rod, and a feeder servomotor, and the feeder servomotor drives the feeder screw rod to implement feeder metering.

* * * * *